May 10, 1949. M. MALKI ET AL 2,469,508
ELECTRICAL ACCUMULATOR WITH TUBULAR ELECTRODES
Filed Feb. 27, 1946
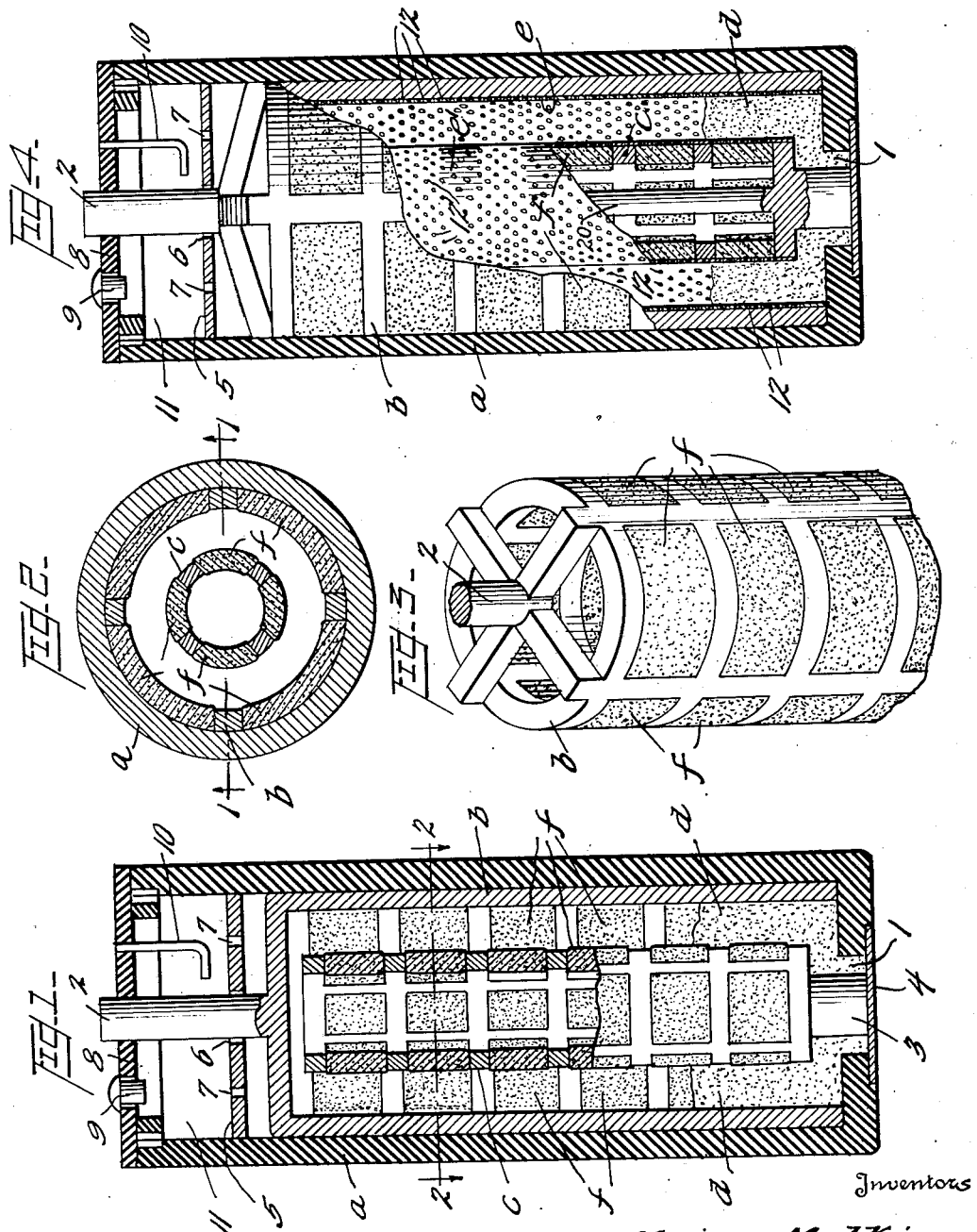
Inventors
Moises Malki
Boris Matzkin
Aron Luis Goldman
By J. Richard Paris
ATTORNEY Patented May 10, 1949

2,469,508

UNITED STATES PATENT OFFICE 2,469,508

ELECTRICAL ACCUMULATOR WITH TUBULAR ELECTRODES

Moises Malki, Boris Matzkin, and Aron Luis Goldman, Buenos Aires, Argentina

Application February 27, 1946, Serial No. 650,723
In Argentina October 2, 1945

5 Claims. (Cl. 136—6)

This invention relates to electrical accumulators, and particularly to a device of this type which due to its special features, is suitable for use in place of the ordinary dry cells.

It is known that the production of a small size electrical accumulator capable of behaving in a manner similar to that of a small dry cell, with all the inherent advantages thereof but without the drawbacks of the ordinary electrolytic accumulators, involves considerable difficulties, to the extent that the attempts made heretofore to produce such device have not been successful.

The problem in question offers two different and well defined aspects: the first one is constituted by the difficulty in obtaining a non-mobile electrolyte which will minimize the drawbacks derived from the unavoidable use of a solution of a conductive salt, such as the usual sulphuric acid solution; and the second aspect relates to the difficulty in securing a construction capable of satisfactorily holding said non-mobile electrolyte in any position, without preventing or affecting the charging operation, during which an electrolytic process is developed which caused the production of gases which should be removed, and such construction should also be of reduced size, have a long life and be economical.

This invention only contemplates the solution of the second point only, that is to say, the one relating to the construction of the accumulator itself.

To this end, the invention comprises an arrangement of the type including two electrodes provided with terminals, one of said electrodes being arranged within the other, with the free space between both electrodes filled with a non-mobile electrolyte. The accumulator of the present invention is characterized in that it comprises an auxiliary chamber communicating with the container holding the non-mobile electrolyte by means of one or more orifices formed in a bottom partition, said auxiliary chamber being provided with a closable orifice for the purpose of adding the active ingredient of the immobile electrolyte, and with a safety means for releasing gases, said safety means extending from a point spaced from the partition within the auxiliary chamber, to the atmosphere. Also, one of the electrodes extends through said auxiliary chamber and out of the accumulator, so as to form one of the terminals thereof.

It may be seen from the above that one of the main objects of the invention is to provide an electrical accumulator capable of holding therein the non-mobile electrolyte, under any condition of use or position, while permitting the operation of electrically charging same.

A further and important object of the invention is to provide an electrical accumulator of the character described in the preceding paragraph, wherein the active ingredient of the immoble electrolyte may be readily added or replaced when required.

A further object of the invention is to provide an accumulator capable of meeting requirements similar to those of the ordinary dry cells, even as regards size and handling thereof.

A still further object of the invention is to provide an accumulator having the above features, which may be readily manufactured at a reduced cost.

Other objects and advantages of the invention will become apparent to those skilled in the art, from the following description taken in conjunction with the accompanying drawings illustrating a preferred embodiment of the invention and wherein:

Fig. 1 is a longitudinal sectional view of one form of the invention taken on line 1—1 in Fig. 2. Fig. 2 is a transverse sectional view taken on line 2—2 of Fig. 1. Fig. 3 is a perspective of the outer electrode. Fig. 4 is a longitudinal sectional view of a modification relating particularly to the improvement of a permeable layer of insulating material on the operating faces of the electrodes. The drawings are to an enlarged scale.

The same reference characters are used to indicate like or corresponding parts or elements throughout the drawings.

In the drawings, $a$ indicates an outer casing of the accumulator, which is preferably made of insulating, strong material, sufficiently hard to withstand the usual handling without being distorted or damaged, such as Bakelite or other plastic.

The casing $a$ is cylindrical, the open upper end being sealable by means to be described hereinafter, while the lower end is substantially closed, having only an opening 1 to allow the passage therethrough of the terminal of one of the electrodes.

The antimonial lead electrodes $b$ and $c$ are arranged within the casing. Electrode $b$, constituting the anode, is a hollow cylindrical electrode snugly fitting within the casing $a$ and bearing against the bottom thereof. The lower end of said electrode $b$ is open, while the upper end thereof is provided with an extension 2 constituting the connecting terminal of said element.

Electrode c, constituting the cathode, is of smaller size than electrode b but of similar shape, and is concentrically arranged in inverted position within said electrode b. One of the ends of said cathode electrode c is also open, while the other end includes an extension 3, slightly shorter than extension 2, also constituting a corresponding terminal. Said terminal 3 is loosely fitted in the orifice 1 in the bottom end of casing a and is crowned by a contact button 4, also made of antimonial lead, the outer surface of which is tinned for the purpose of improving the contact. The end of said terminal 2 is also tinned for the same purpose.

As will be seen from Figs. 2 and 3 and the other figures in the drawings, each of the electrodes comprises a cylindrical grid construction providing spaces receiving a suitable paste f for electrochemical reaction. A satisfactory composition of said paste includes red lead, litharge, barium sulphate, sulphuric acid and distilled water. The paste for the positive electrode is made up of 54 parts by weight of red lead ($Pb_3O_4$) and 30 parts of litharge (PbO), these two materials being mixed with 8 parts of dilute sulphuric acid of 28° Bé. and 8 parts of distilled water.

The negative plate is formed of 29 parts by weight of red lead, 52 parts of litharge, 1 part of lamp-black, 2 parts of barium oxide mixed with 8 parts of dilute sulphuric acid of 28° Bé. and 8 parts of distilled water.

Also, the free space between the anode and the cathode is filled with a non-mobile electrolyte, which should be of a pasty character so as to prevent substantial movements of the sulphuric acid solution constituting the electrolytically active ingredient of the immobile electrolyte.

The immobile electrolyte may correspond to electrolytes disclosed in application Serial No. 650,722 filed on February 27, 1946 or in application Serial No. 703,500 filed on October 16, 1946. If desired, the immobile electrolyte may be composed as follows:

| | Parts by weight |
|---|---|
| Aqueous solution of sulphuric acid of 33° Bé | 64 |
| Sodium silicate | 32 |
| Powdered asbestos | 4 |

At a short distance from the upper end of electrode b is a partition 5, made of the same material of the body a, said partition being provided with a central perforation 6 for the passage of terminal 2, and a plurality of orifices 7, of smaller size than that of the perforation 6. Said partition is located at a certain distance below the mouth of casing a, thereby closing the space wherein the electrodes are located, which is completely filled with the non-mobile electrolyte d.

The mouth of the casing a is tightly closed by means of a lid 8, made of the same material as a and 5 and also traversed by the terminal 2 of anode b, which projects slightly therefrom, said lid being also provided with a small auxiliary stopper 9 for the purpose of addition or renewal of the active ingredient of the immobile electrolyte, and also a small bent tube 10 which is spaced from the bottom of the auxiliary chamber 11 defined by the partition 5, lid 8 and inner wall of the casing a.

By means of the combined action of the bent tube 10, acting as a valve, and of the chamber, the gas (sulphurous anhydride) evolved during the charge of the accumulator may be released. This gas will flow through the orifices 7 of partition 5, through conduit 10, to the atmosphere. Also, during said charging period wherein a feed of oxygen is required, the latter may be introduced following a reverse path to that of the out-flowing anhydride. On the other hand, during the same period the non-mobile electrolyte passes through the orifices 7 in partition 5 and passes to the auxiliary chamber 11, from where it cannot escape due to the fact that the only outlet is constituted by the bent tube 10, acting as an effective safety valve due to the shape and location thereof, which prevents the outflow of the non-mobile electrolyte in any position assumed by the accumulator. Therefore, the accumulator will operate effectively whether it is placed upright as shown in the drawings, horizontally, in inverted position or in any intermediate position, resisting even sudden shocks. Naturally, once the charge is exhausted, the liquid introduced in the auxiliary chamber 11 will again pass to the pasty mass d constituting the non-mobile electrolyte, leaving said auxiliary chamber empty.

Also, the accumulator of the present invention will withstand severe handling, since all of the elements thereof are of sturdy construction. The optimum strength for this class of device may be obtained by making the casing a of laminated plastic material.

The example of Fig. 4 does not differ fundamentally from that of the previous figures, but includes an important additional feature improving the device.

Said feature is constituted by the permeable layers e and e' formed by thin sheets of insulating material which is not attackable by the components of the electrolyte, as for example a synthetic plastic material of the phenolic type.

The sheets forming the permeable layers are provided with multiple perforations 12 which, without adversely affecting the strength thereof, allow the ready inter-communication of the electrolyte therethrough. Permeable layer e is arranged against the inner face of anode b, thereby having a substantially cylindrical shape, while permeable layer e' is arranged against the external face of cathode c, which like b consists of a grid-like structure filled with a paste f suitable for electrochemical reaction. Thus, both permeable layers e and e' are arranged against the free faces of electrodes b and c, and it is therefore evident that the paste f cannot fall off the cells thereof, whereby it is even possible to increase the amount of paste. The advantages of this arrangement are important, since apart from preventing the fall of the paste, the capacity of the electrodes is increased; also, this arrangement avoids the possibility of a short-circuit therebetween. The electrode c may have integrally formed therewith a central rod 20, as shown in Fig. 4, which aids in manipulating the electrode when the paste is applied.

As regards the operation of the accumulator described, it is effected in the usual manner and it is therefore not considered necessary to describe same in detail.

It is evident that in carrying out the invention, several changes in the construction and details of the accumulator will occur to those skilled in the art, without departing from the scope of the invention as clearly set forth in the appended claims.

We claim:

1. An electrical accumulator comprising a tubular insulating casing having apertured top and bottom closures, an external terminal plate on the bottom of the casing, a first open ended tubular electrode disposed within the casing and fitting snugly against the tubular side walls thereof, the lower end of said electrode being disposed near the bottom of the casing, the upper end of the electrode being spaced from the top of the casing and forming an air chamber therewith, a central rod integral with the first electrode passing through the apertured top of the casing and forming a second terminal, means integrally connecting said rod and first electrode and providing communication passages between the interior of the first electrode and the air chamber, a second electrode disposed within and centrally of said first electrode, an immobile electrolyte filling the annular space between said electrodes, and a rod-like connection passing through the aperture in the bottom and rendering the second electrode integral with the terminal plate.

2. An electrical accumulator comprising a tubular insulating casing having apertured top and bottom closures, an external terminal plate on the bottom of the casing, a first open ended tubular electrode disposed within the casing and fitting snugly against the side walls thereof, the upper end of the electrode being spaced from the top of the casing and forming an air chamber communicating with the interior of the first electrode, a rod integral with the first electrode passing through the apertured top of the casing and forming a second terminal, a second electrode disposed within and centrally of said first electrode, an immobile electrolyte filling the annular space between said electrodes, and a rod-like connection passing through the aperture in the bottom and rendering the second electrode integral with the terminal plate.

3. An electrical accumulator comprising a tubular insulating casing having top and bottom closures, an external terminal plate on the bottom of the casing, a first open ended tubular electrode disposed within the casing and fitting snugly against the side walls thereof, the upper end of the electrode being spaced from the top of the casing and forming an air chamber in communication with the interior of the electrode, a rod interval with the first electrode passing through the top of the casing and forming a second terminal, a second electrode disposed within and centrally of said first electrode and integrally connected to said terminal plate, and an immobile electrolyte filling the annular space between said electrodes.

4. An electrical accumulator comprising a tubular insulating casing having top and bottom closures, an external terminal plate on the bottom of the casing, a first open ended arcuate electrode disposed within the casing and fitting snugly against the side walls thereof, the upper end of the electrode being spaced from the top of the casing and forming an air chamber in communication with the interior of the electrode, a second terminal integral with the first electrode and passing through the top of the casing, a second electrode disposed within and equally spaced from said first electrode and integral with said terminal plate, a permeable insulating sheet material lodged against the operating faces of said electrodes, and an immobile electrolyte filling the annular space between said electrodes.

5. An electrical accumulator comprising a tubular insulating casing having apertured top and bottom closures, an external terminal plate on the bottom of the casing, a partition in said insulating casing forming a main chamber and an auxiliary air chamber communicating by means of at least one orifice formed in said partition, a first open ended tubular electrode disposed within the main chamber of the casing and fitting against the tubular side wall thereof, the lower end of said electrode being disposed near the bottom of the main chamber, the upper end of the said electrode being disposed near the said partition, a central rod integral with the first electrode passing through the partition and the apertured top of the casing and forming a second terminal, means integrally connecting said rod and first electrode and providing communication passages between the interior of the first electrode and the air chamber, a second electrode disposed within and centrally of said first electrode, an immobile electrolyte filling at least the annular space between said electrodes, a rod-like connection passing through the aperture in the bottom and rendering the second electrode integral with the terminal plate, said auxiliary chamber being provided with means for allowing the filling or renewal of the electrolyte, and a safety conduit for the release of gases, communicating with the atmosphere and extending to the interior of said auxiliary chamber, spaced from the partition.

MOISES MALKI.
BORIS MATZKIN.
ARON LUIS GOLDMAN.

REFERENCES CITED

The following references are of record in the file of this patent:

UNITED STATES PATENTS

| Number | Name | Date |
|---|---|---|
| 1,149,988 | Standt | Aug. 10, 1915 |
| 2,049,201 | Dunzweiler et al. | July 28, 1936 |